United States Patent
Jung et al.

(10) Patent No.: US 9,170,653 B1
(45) Date of Patent: Oct. 27, 2015

(54) MOTION RECOGNITION METHOD

(71) Applicant: HYSONIC. CO., LTD., Ansan-si (KR)

(72) Inventors: He Won Jung, Ansan-si (KR); Gi Hong Kim, Ansan-si (KR)

(73) Assignee: HYSONIC CO., LTD. (KR)

( * ) Notice: Subject to any disclaimer, the term of this patent is extended or adjusted under 35 U.S.C. 154(b) by 0 days.

(21) Appl. No.: 14/398,801

(22) PCT Filed: Nov. 29, 2013

(86) PCT No.: PCT/KR2013/011001
§ 371 (c)(1),
(2) Date: Nov. 4, 2014

(87) PCT Pub. No.: WO2014/119838
PCT Pub. Date: Aug. 7, 2014

(30) Foreign Application Priority Data

Jan. 30, 2013 (KR) .................. 10-2013-0010155
Jan. 30, 2013 (KR) .................. 10-2013-0010156

(51) Int. Cl.
*G01B 11/00* (2006.01)
*G06F 3/01* (2006.01)
*G06F 3/042* (2006.01)

(52) U.S. Cl.
CPC .............. *G06F 3/017* (2013.01); *G06F 3/0421* (2013.01)

(58) Field of Classification Search
CPC ....... G06F 3/017; G06F 3/0325; G06F 3/011; G06F 3/0421; G06K 9/00362; G06K 9/00375; B60R 21/01552; G01B 11/14; G01B 11/002; G01B 7/004

USPC ........... 356/614–623; 250/221, 239; 345/166, 345/175–176
See application file for complete search history.

(56) References Cited

U.S. PATENT DOCUMENTS

| | | | | |
|---|---|---|---|---|
| 5,587,558 A | * | 12/1996 | Matsushima | G06F 3/03545 178/18.01 |
| 8,660,300 B2 | | 2/2014 | Svajda et al. | |
| 2007/0070358 A1 | * | 3/2007 | Ouchi | G01S 17/875 356/614 |

(Continued)

FOREIGN PATENT DOCUMENTS

| | | |
|---|---|---|
| KR | 1020080093304 | 10/2008 |
| KR | 1020100068222 | 6/2010 |

(Continued)

OTHER PUBLICATIONS

International Search Report—PCT/KR2013/011001 dated Feb. 28, 2014.

*Primary Examiner* — Hoa Pham
(74) *Attorney, Agent, or Firm* — Cantor Colburn LLP

(57) ABSTRACT

A motion recognition method includes: a light detecting step of detecting light reflected by the reflective body to measure a luminous intensity of the light by the light receiving element; a first coordinate setting step of setting a planar coordinate (X1, Y1) of the reflective body; a second coordinate setting step of setting a planar coordinate (X2, Y2) of the reflective body; and a direction determining step of obtaining an angle (θ) between a line segment connecting the origin and the planar coordinate (X1, Y1) in the first position and a line segment connecting the planar coordinate (X1, Y1) in the first position and the planar coordinate (X2, Y2) in the second position and determining that the reflective body moves in a direction passing through a ½ point of the angle (θ) in the first position by the data processing unit.

17 Claims, 10 Drawing Sheets

(a)   (b)

(56) References Cited

U.S. PATENT DOCUMENTS

2009/0153880 A1* 6/2009 Klaver ................ G03F 7/70775
356/614
2013/0020464 A1 1/2013 Jung et al.
2014/0327920 A1* 11/2014 Bridges ................ G01B 11/002
356/614

FOREIGN PATENT DOCUMENTS

| KR | 1020110082010 | 7/2011 |
| KR | 101090965 | 12/2011 |
| KR | 1020120019453 | 3/2012 |
| WO | 2010035240 | 4/2010 |
| WO | 2011082004 | 7/2011 |

* cited by examiner (a) (b)

(a) (b)

(a) (b)

(a) (b)

(a)

(b)

(a)

(b)

(c)

(d)

(a)

(b)

(c)

(d)

(a)

(b)

(c)

(d)

(a)  (b)

(a)  (b)

(a) (b)

(a) (b)

(a)　　　　　　　　(b)

MOTION RECOGNITION METHOD

TECHNICAL FIELD

The present invention relates to a motion recognition method, and more particularly to a motion recognition method in which, in order to execute various functions of an electronic device according to a motion of a reflective body such as a hand of a user, a light emitting element projects light and a light receiving element detects light reflected by the reflective body to determine an movement direction of the reflective body.

BACKGROUND ART

In general, recognition of a motion is based on a step of repeatedly measuring reflection degrees of a reflective body, a step of identifying a change in a proximate location of the reflective body over time by comparing the measured reflection degrees, and a step of analyzing a change at the proximate location of the reflective body with a motion associated with a specific gesture which can be analyzed as a movement of the user or a motion vector of the reflective body, in order to determine a proximate location of the reflective body.

The location of the reflective body depends on both the point of compass of a surface of the reflective body and a reflection degree of the surface of the reflective body, and thus is an approximate value.

It is generally very inaccurate to use a value of a reflection degree from a simple optical system for obtaining an absolute value of a distance.

Korean Patent Application Publication No. 10-2010-0068222 discloses an apparatus and a method for recognizing an optical gesture.

The optical gesture recognizing apparatus according to the related art includes: a first light source; a first light receiver configured to receive reflected light from a reflective body when the first light source is operated and output a primarily measured reflection degree value corresponding to the intensity of the reflection light; and a processor configured to receive the primarily measured reflection degree value, and the processor compares the primarily measured reflection degree values at a first angle of view and a second angle of view to track a motion of the reflective body, and identifies a gesture of an object corresponding to the tracked motion of the reflective body.

The optical gesture recognizing method according to the present invention includes: a step of measuring an intensity of reflection light from a reflective body at a first angle of view to obtain a primarily measured reflection degree value; a step of measuring the intensity of the reflection light from the reflective body at a second angle of view to obtain a secondarily measured reflection degree value; a step of comparing the primarily measured reflection degree value and the secondarily measured reflection degree value to determine a relative motion of the object; and a step of identifying a gesture corresponding to a relative motion of the reflective body.

However, because it is difficult to clearly classify and recognize a complex or unclear gesture or motion in the optical gesture recognizing method according to the related art, reliability of a motion identifying function deteriorates.

That is, a specific motion may not be accurately recognized such that a reaction corresponding to the motion may not occur or may be recognized as another motion, causing an intended reaction.

Accordingly, operation errors of electronic devices based on recognition of a motion may frequently occur, and a user may feel inconvenient when using the electronic device or have distrust against a motion identification function.

DISCLOSURE

Technical Problem

The present invention has been made in an effort to solve the above-mentioned problems, and provides a motion recognition method in which, in order to execute various functions of an electronic device according to a motion of a reflective body such as a hand of a user, a light emitting element projects light and a light receiving element detects light reflected by the reflective body to determine an movement direction of the reflective body, thereby making it possible to clearly classifying and recognizing a motion and increase reliability of a motion switch.

Technical Solution

In accordance with an aspect of the present invention, there is provided a motion recognition method in which a light emitting element projects light and a light receiving element detects the light reflected by a reflective body to recognize a motion of the reflective body, the motion recognition method including: a light detecting step of detecting light reflected by the reflective body to measure a luminous intensity of the light by the light receiving element; a first coordinate setting step of setting a planar coordinate (X1, Y1) of the reflective body in which the center of a light reception range of the light receiving element is taken as the origin thereof in a first position using the luminous intensity of the light by a data processing unit; a second coordinate setting step of setting a planar coordinate (X2, Y2) of the reflective body in which the center of a light reception range of the light receiving element is taken as the origin thereof in a second position using the luminous intensity of the light by a data processing unit; and a direction determining step of, when the reflective body moves from the first position to the second position, obtaining an angle (θ) between a line segment connecting the origin and the planar coordinate (X1, Y1) in the first position and a line segment connecting the planar coordinate (X1, Y1) in the first position and the planar coordinate (X2, Y2) in the second position and determining that the reflective body moves in a direction passing through a ½ point of the angle (θ) in the first position by the data processing unit.

The data processing unit continuously calculates a plurality of planar coordinates (X, Y) on a path which starts from the origin (0, 0) and arrives at the origin (0, 0) again via the first position and the second position according to a light projection interval of the light emitting element, calculates standard values (N) of the planar coordinates (X, Y) with reference to the origin (0, 0), and sets positions of a start point and an end point of a section (2) in which the standard value (N) decreases and then increases as the first position and the second position, and the standard value (N) is calculated in the following equation.

$$N = \sqrt{X^2 + Y^2}$$

In the direction determining step, a direction in which the reflective body moves is calibrated by adding a weight to the angle (θ).

The light emitting elements are disposed to be spaced apart from each other with respect to each other at an interval of 90°, the center of the light receiving element is the origin of the planar coordinate, the light emitting element includes: first and second light emitting elements disposed to face each other with respect to the light receiving element; and third and fourth light emitting elements disposed to face each other with respect to the light receiving element, X1 and X2 which are X axis coordinate components of the planar coordinate of the reflective body are calculated by comparing the luminous intensities of the light projected by the first light emitting element and the second light emitting element and reflected by the reflective body, and Y1 and Y2 which are X axis coordinate components of the planar coordinate of the reflective body are calculated by comparing the luminous intensities of the light projected by the third light emitting element and the fourth light emitting element and reflected by the reflective body.

An interpolation element for interpolating the intensities of the light projected by the light emitting elements and detected by the light receiving element is further disposed adjacent to the light emitting element.

In the direction determining step, a movement direction of the reflective body is determined only when the luminous intensity of the light detected by the light receiving element is a predetermined value or more.

In the detection determining step, when the luminous intensity of the light detected by the light receiving element repeatedly increases and decreases, it is determined that the reflective body moves in a predetermined pattern.

In the direction determining step, when a change rate of the intensity of the light detected by the light receiving element changes according to a predetermined pattern, it is determined that the reflective body rotates.

In accordance with another aspect of the present invention, there is provided a motion recognition method in which a light emitting element projects light and a light receiving element detects the light reflected by a reflective body to recognize a motion of the reflective body, the motion recognition method including: a light detecting step of detecting light reflected by the reflective body to measure a luminous intensity of the light by the light receiving element; a first coordinate setting step of setting a planar coordinate (X1, Y1) of the reflective body in which the center of a light reception range of the light receiving element is taken as the origin thereof in a first position using the luminous intensity of the light by a data processing unit; a second coordinate setting step of setting a planar coordinate (X2, Y2) of the reflective body in which the center of a light reception range of the light receiving element is taken as the origin thereof in a second position using the luminous intensity of the light by a data processing unit; and a direction determining step of, when the reflective body moves from the first position to the second position, determining that the reflective body moves in any one of the X axis direction and the Y axis direction according to a relative position of X1 and X2 which are X axis coordinate components and a relative position of Y1 and Y2 which are Y axis coordinate components by the data processing unit.

The data processing unit continuously calculates a plurality of planar coordinates (X, Y) on a path which starts from the origin (0, 0) and arrives at the origin (0, 0) again via the first position and the second position according to a light projection interval of the light emitting element, and sequentially sets the positions at which points of inflections where an X axis coordinate component and a Y axis coordinate component of the planar coordinate increases or decreases on the path appear as the first position and the second position.

If X1 and X2 are located on opposite sides of the Y axis on the coordinate plane and Y1 and Y2 are located on the same side of the X axis on the coordinate plane, it is determined in the direction determining step that the reflective body moves in the X axis direction.

If X1 and X2 are located on the same side of the Y axis on the coordinate plane and Y1 and Y2 are located on opposite sides of the X axis on the coordinate plane, it is determined in the direction determining step that the reflective body moves in the Y axis direction.

When X1 and X2 are located on opposite sides of the Y axis on the coordinate plane and Y1 and Y2 are located on opposite sides of the X axis on the coordinate plane, it is determined in the direction determining step that the reflective body moved in the X axis direction if the X axis coordinate components X1 and X2 and the Y axis coordinate components Y1 and Y2 satisfy the following equation.

$$cX1sX2c/cY1sY2c$$

When X1 and X2 are located on opposite sides of the Y axis on the coordinate plane and Y1 and Y2 are located on opposite sides of the X axis on the coordinate plane, it is determined in the direction determining step that the reflective body moved in the Y axis direction if the X axis coordinate components X1 and X2 and the Y axis coordinate components Y1 and Y2 satisfy the following equation.

$$cX1sX2cZcY1sY2c$$

If the planar coordinate (X1, Y1) is located on the Y axis except for the origin in the first position and Y2 is larger or smaller than Y1, it is determined in the direction determining step that the reflective body moves in the Y axis direction, and if the planar coordinate (X1, Y1) is located on the X axis except for the origin in the first position and X2 is larger or smaller than X1, it is determined in the direction determining step that the reflective body moves in the X axis direction.

When X1 and X2 are located on the same side with respect to the Y axis and Y1 and Y2 are located on the same side with respect to the X axis, it is determined in the direction determining step that the reflective body move in any one of the X axis direction and the Y axis direction according to a relative difference between an angle between the X axis and the planar coordinate (X1, Y1) and an angle between the X axis and the planar coordinate (X2, Y2).

The light emitting elements are disposed to be spaced apart from each other with respect to each other at an interval of 90°, the center of the light receiving element is the origin of the planar coordinate, the light emitting element includes: first and second light emitting elements disposed to face each other with respect to the light receiving element; and third and fourth light emitting elements disposed to face each other with respect to the light receiving element; and X1 and X2 which are X axis coordinate components of the planar coordinate of the reflective body are calculated by comparing the luminous intensities of the light projected by the first light emitting element and the second light emitting element and reflected by the reflective body, and Y1 and Y2 which are Y axis coordinate components of the planar coordinate of the reflective body are calculated by comparing the luminous intensities of the light projected by the third light emitting element and the fourth light emitting element and reflected by the reflective body Advantageous Effects The motion detection method according to the present invention has the following effects.

A complex and unclear motion can be clearly classified and recognized by calculating an entry angle of the reflective body and determining a movement direction of the reflective body based on the first position coordinate and the second position coordinate with reference to the origin, and accordingly, an operation error of an electronic device based on recognition of a motion can be minimized and the electronic device can be conveniently used by increasing reliability of the motion switch operated by a motion.

BEST MODE

Mode for Invention

Figure 1:
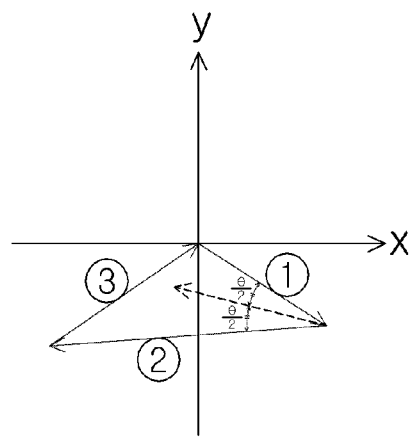
FIG. 1 is a view showing an operation of determining a movement direction of a reflective body in a motion recognition method according to an aspect of the present invention.
Figure 1:
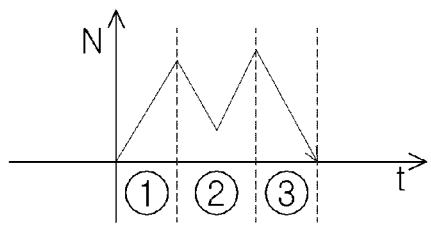

FIG. 1 is a view showing an operation of determining a movement direction of a reflective body in a motion recognition method according to an aspect of the present invention.

The motion detection method of the present invention includes a light detecting step, a first coordinate setting step, a second coordinate setting step, and a direction determining step.

The motion recognition method is realized by a motion switch including a light emitting element 10, a light receiving element 20 for detecting light projected from the light emitting element 10, and a data processing unit (not shown) for determining and determining data information input through the light detected by the light receiving element 20.

Korean Patent No. 10-1090965 discloses a motion detection switch of the applicant of the present invention, and the motion switch may be a type of motion switch which can realize a motion recognition method.

In the light detecting step, the light receiving element 20 detects the light reflected by the reflective body and measures a luminous intensity of the light.

In the first coordinate setting step, the data processing unit sets a planar coordinate (X1, Y1) of the reflective body in which the center of a light reception range of the light receiving element 20 is taken as the origin in a first position using the luminous intensity of the light.

In the second coordinate setting step, the data processing unit sets a planar coordinate (X2, Y2) of the reflective body in which the center of a light reception range of the light receiving element 20 is taken as the origin in a second position using the luminous intensity of the light.

In detail, the data processing unit continuously calculates a plurality of planar coordinates (X, Y) on a path which starts from the origin (0, 0) and arrives at the origin (0, 0) again via the first position and the second position according to a light projection interval of the light emitting element, and calculates standard values N of the planar coordinates (X, Y) with reference to the origin (0, 0).

The standard values N are calculated in the following equation.

$$N = \sqrt{X^2 + Y^2}$$

The data processing unit sets positions of a start point and an end point of a section (2) in which the standard value N decreases and then increases as shown in FIG. 1B as the first position and the second position.

FIG. 1B is a graph showing a change in the standard value N according to time t, and the standard value N decreases when the reflective body approaches the origin and increases when the reflective body grows apart from the origin.

In the direction determining step, when the reflective body moves from the first position to the second position, the data processing unit obtains an angle θ between a line segment (1) connecting the origin and the planar coordinate (X1, Y1) in the first position and a line segment (2) connecting the planar coordinate (X1, Y1) in the first position and the planar coordinate (X2, Y2) in the second position and determines that the reflective body moves in a direction passing through a ½ point of the angle θ in the first position.

Meanwhile, in the direction determining step, a direction in which the reflective body moves can be calibrated by adding a weight to the angle θ.

In the detection determining step, when the luminous intensity of the light detected by the light receiving element 20 repeatedly increases and decreases, it is determined that the reflective body moves in a predetermined pattern.

That is, if the user repeats the same operation in the light reception range of the light receiving element, the data processing unit may recognize that the luminous intensity of the light detected by the light receiving element 20 repeatedly increases and decreases in a specific pattern.

Accordingly, if the data processing unit recognizes the repeated special operation signal, a special function corresponding to the operation signal may be executed in a system (an electronic device or the like) based on recognition of a motion.

In the above-described motion recognition method, a complex and unclear motion can be clearly classified and recognized by calculating an entry angle of the reflective body and determining a movement direction of the reflective body based on the first position coordinate and the second position coordinate with reference to the origin, and accordingly, an operation error of an electronic device based on recognition of a motion can be minimized and the electronic device can be conveniently used by increasing reliability of the motion switch operated by a motion.

First Embodiment

Figure 2:
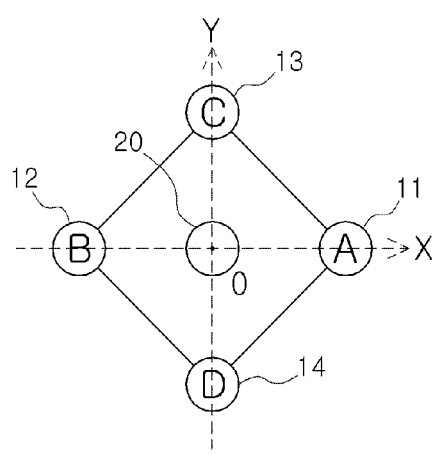
FIG. 2 is a view schematically showing a structure of a motion switch according to a first embodiment of the present invention.
Figure 2:
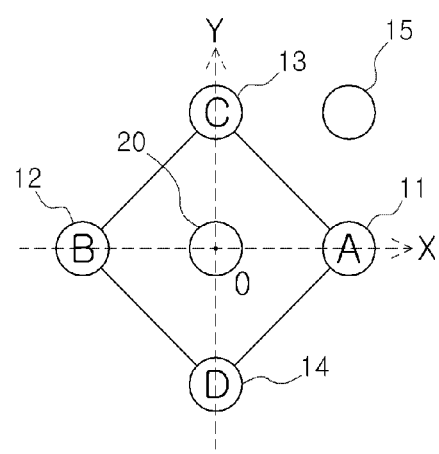
Figure 3:
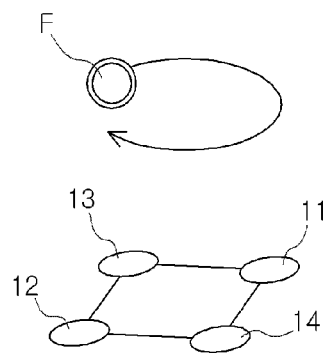
FIG. 3 is a view showing a recognition pattern of a special motion of a reflective body.
Figure 3:
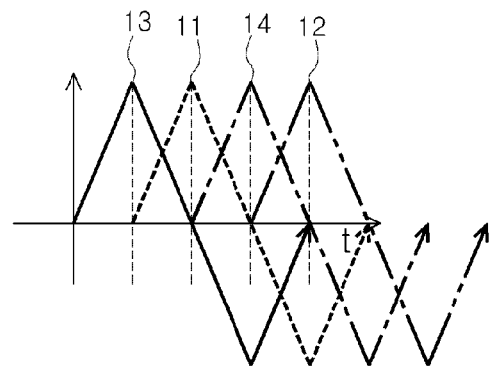

FIG. 2A is a view schematically showing a structure of a motion switch according to a first embodiment of the present invention. FIG. 2B shows a motion switch further including an interpolation element in FIG. 2A. FIG. 3 is a view showing a recognition pattern of a special motion of a reflective body.

The motion switch for realizing the motion recognition method according to the present invention includes a light emitting element 10, a light receiving element 20, and a data processing unit (not shown).

The light receiving element 10 includes first and second light emitting elements 11 and 12 disposed to face each other while taking the light receiving element 20 as the center thereof, and third and fourth light emitting elements 13 and 14 disposed to face each other while taking the light receiving element 20 as the center thereof, and the first to fourth light emitting elements 11, 12, 13, and 14 are disposed to be spaced apart from each other by an interval of 90° while taking the light receiving element 20 as the center thereof to sequentially project light at a predetermined interval.

Accordingly, if a reflective body such as a hand of the user passes over the motion switch, the light projected from the light emitting element 10 is reflected by the reflective body and the light receiving element 20 detects the reflected light.

Then, the luminous intensity of the light detected by the light receiving element 20 changes according to the position of the reflective body and the luminous intensity of the light is converted into analog data.

The data processing unit compares the analog data of the light projected by the first light emitting element 11 and the second light emitting element 12 and detected by the light receiving element 20, and calculates X axis coordinate component values of the planar coordinates in the positions of the reflective body.

$$X=A-B$$

(A: Luminous intensity of light projected by the first light emitting element, B: Luminous intensity of light projected by the second light emitting element)

If the reflective body is located over the light receiving element 20 corresponding to the origin of the planar coordinate, the values of A and B are the same such that X=0, if the reflective body moves toward the first light emitting element 11, A increases and B decreases such that X>0, and if the reflective body moves toward the second light emitting element 12, A decreases and B increases such that X<0.

The data processing unit compares the analog data of the light projected by the third light emitting element 13 and the fourth light emitting element 14 and detected by the light receiving element 20, and calculates Y axis coordinate component values of the planar coordinates in the positions of the reflective body.

$$Y=C-D$$

(C: Luminous intensity of light projected by the third light emitting element, B: Luminous intensity of light projected by the fourth light emitting element)

If the reflective body is located over the light receiving element 20 corresponding to the origin of the planar coordinate, the values of C and D are the same such that Y=0, if the reflective body moves toward the third light emitting element 13, A increases and C decreases such that X>0, and if the reflective body moves toward the fourth light emitting element 14, C decreases and D increases such that X<0.

As described above, when the reflective body moves from the first position to the second position, the data processing unit obtains an angle θ between a line segment (1) connecting the origin and the planar coordinate (X1, Y1) in the first position and a line segment (2) connecting the planar coordinate (X1, Y1) in the first position and the planar coordinate (X2, Y2) in the second position and determines that the reflective body moves in a direction passing through a ½ point of the angle θ in the first position.

The motion switch is operated only when the luminous intensity of the light detected by the light receiving element 20 is a predetermined reference or more.

Because the light receiving element 20 detects the light introduced through an upper opened space of the motion switch, external light other than the light projected by the light emitting element 10 and reflected by the reflective body can be detected.

Accordingly, an error in determining a movement direction of the reflective body can be prevented by deferring the movement direction of the reflective body when the luminous intensity of the light detected by the light receiving element 20 is smaller than the predetermined reference value, and determining the movement direction of the reflective body only when the luminous intensity of the light detected by the light receiving element 20 is a predetermined reference value or more.

Furthermore, in order to flexibly respond to an external condition, the reference value may be changed with reference to the luminous intensity of the light reflected by the reflective body and detected by the light receiving element 20.

In addition, when the reflective body enters the light reception range of the light receiving element 20 and is not withdrawn from the light reception range for a predetermined time period, determination of a direction of the reflective body in the direction determining step is deferred.

Moreover, when the reflective body enters the light reception range, the user is informed of detection of the reflective body through light, vibrations, sounds, or the like.

Meanwhile, as shown in FIG. 2B, the motion switch may further include an interpolation element 15.

The interpolation element 15 is disposed adjacent to the light emitting element 10, and may interpolate the analog data of the light projected by the light emitting element and detected by the light receiving element to increase reliability of data.

When the axial direction of the planar coordinate of the motion switch and a direction of a system (an electronic device or the like) recognized by the motion switch are not symmetrical to each other, the coordinate value set by the motion switch can be adjusted through structural rotational conversions and translational conversions to be applied.

As shown in FIG. 3, in the direction determining step, the data processing unit may determine that the reflective body F rotates when a change rate of the luminous intensity of the light detected by the light receiving element 20 changes according to a predetermined pattern.

FIG. 3A is a view showing a state in which the reflective body F rotates over the light emitting element 11, 12, 13, and 14. FIG. 3B is a graph depicting a change rate of the luminous intensity of the light projected by the light emitting elements 11, 12, 13, and 14 and detected by the light receiving element 20 over time t.

In an example of the first light emitting element 11 of the light emitting elements, a change rate of the analog data of the light projected by the first light emitting element 11 and detected by the light receiving element 20 when the reflective body F passes over the first light emitting element 11 over time t is largest, and a change rate of the analog data of the light projected by the first light emitting element 11 and detected by the light receiving element 20 when the reflective body F passes over the second light emitting element 11 disposed on an opposite side of the first light emitting element 11 with respect to the light receiving element 20 over time t is smallest.

The second light emitting element 12, the third light emitting element 13, and the fourth light emitting element 14 also have change rates of the analog data over time t in the same pattern as that of the first light emitting element 11.

Accordingly, the data processing unit may recognize that the reflective body rotates over the motion switch by recognizing the pattern of the analog data, and a system (an electronic device or the like) based on detection of a motion may be allowed to execute a special function corresponding to the motion according to a rotation operation of the reflective body.

Second Embodiment

The second embodiment is different from the first embodiment in an aspect of disposition structures of the light emitting device and the light receiving structure.

Figure 4:
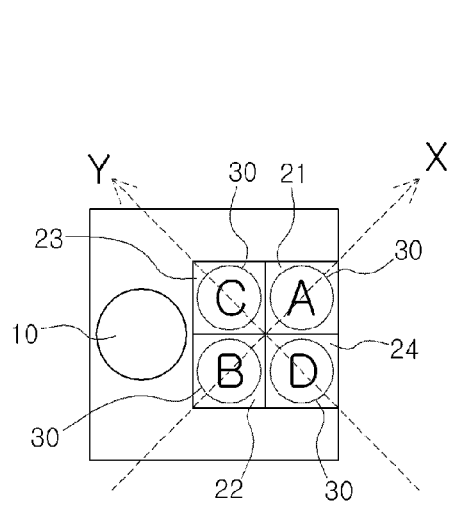
FIG. 4 is a view schematically showing a structure of a motion switch according to a second embodiment of the present invention.
Figure 4:
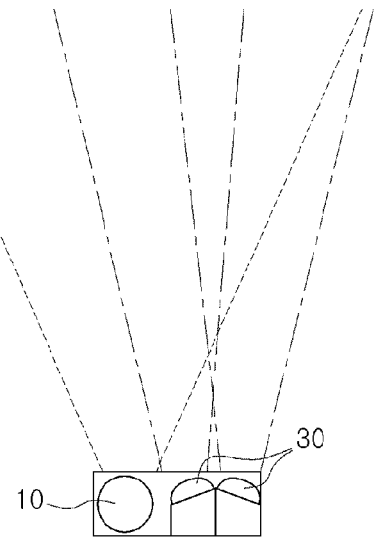

FIG. 4A is a view schematically showing a planar structure of a motion switch according to a second embodiment of the present invention. FIG. 4B is a view schematically showing a side structure of the motion switch according to the second embodiment of the present invention.

The motion switch for realizing the motion recognition method according to the second embodiment of the present invention includes a light emitting element 10, a light receiving element 20, and a data processing unit (not shown).

The light emitting element 10 projects light at a predetermined interval.

The light receiving elements 20 are disposed to be spaced apart from each other at an interval of 90° while taking the origin acting as the center of the entire light reception range as the center thereof, and the light emitting element 10 is disposed adjacent to the light receiving elements 20.

The light receiving elements 20 include first and second light receiving elements 21 and 22 disposed to face each other with respect to the origin, and third and fourth light receiving elements 23 and 24 disposed to face each other with respect to the origin.

The data processing unit compares the analog data of the light detected by the first light receiving element 21 and the second light receiving element 22, and calculates X axis coordinate component values of the planar coordinates in the positions of the reflective body.

$$X = A - B$$

(A: Luminous intensity of light detected by the first light receiving element, B: Luminous intensity of light detected by the second light receiving element)

The data processing unit compares the analog data of the light detected by the third light receiving element 23 and the fourth light receiving element 24, and calculates Y axis coordinate component values of the planar coordinates in the positions of the reflective body.

$$Y = C - D$$

(C: Luminous intensity of light detected by the third light receiving element, B: Luminous intensity of light detected by the fourth light receiving element)

The light receiving elements 20 include light receiving lenses 30, respectively, and the optical axes of the light receiving lenses 30 are inclined with respect to a vertically upward direction.

Accordingly, the light projected by the light emitting element 10 may be reflected by the reflective body and may be detected by the light receiving elements 20.

The optical axes of the light receiving lenses 30 are inclined with respect to the vertically upward direction such that the light receiving elements 21, 22, 23, and 24 may detect light of the same luminous intensity when the reflective body is located at the center of the light reception range.

The other items of the second embodiment are the same as those of the first embodiment, and a detailed description thereof will be omitted.

The motion detection method according to another aspect of the present invention includes a light detecting step, a first coordinate setting step, a second coordinate setting step, and a direction determining step.

The motion recognition method is realized by a motion switch including a light emitting element 10, a light receiving element 20 for detecting light projected from the light emitting element 10, and a data processing unit (not shown) for determining and determining data information input through the light detected by the light receiving element 20.

Korean Patent No. 10-1090965 discloses a motion detection switch of the applicant of the present invention, and the motion switch may be a type of motion switch which can realize a motion recognition method.

In the light detecting step, the light receiving element 20 detects the light reflected by the reflective body and measures a luminous intensity of the light.

In the first coordinate setting step, the data processing unit sets a planar coordinate (X1, Y1) of the reflective body in which the center of a light reception range of the light receiving element 20 is taken as the origin in a first position using the luminous intensity of the light.

In the second coordinate setting step, the data processing unit sets a planar coordinate (X2, Y2) of the reflective body in which the center of a light reception range of the light receiving element 20 is taken as the origin in a second position using the luminous intensity of the light.

Figure 5:
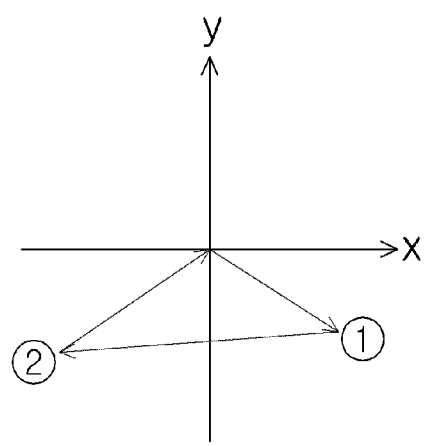
FIG. 5 is a view showing an operation of designating a first position and a second position of a motion recognition method according to another aspect of the present invention.
Figure 5:
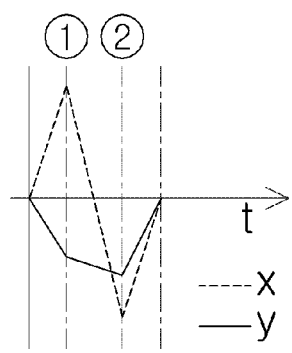

In detail, as shown in FIG. 5, the data processing unit continuously calculates a plurality of planar coordinates on a path which starts from the origin (0, 0) and arrives at the origin (0, 0) again via the first position and the second position according to a light projection interval of the light emitting elements 10, and sequentially sets the positions at which points of inflections where an X axis coordinate component and a Y axis coordinate component of the planar coordinate increases or decreases on the path appear as the first position (1) and the second position (2).

In the direction determining step, when the reflective body moves from the first position to the second position, the data processing unit determines that the reflective body moves in any one of the X axis direction and the Y axis direction according to a relative position of X1 and X2 which are X axis coordinate components and a relative position of Y1 and Y2 which are Y axis coordinate components.

A detailed example of determining a movement direction of the reflective body by comparing the planar coordinate (X1, Y1) in the first position and the planar coordinate (X2, Y2) in the second position according to a position of the reflective body will be described as follows.

1) If X1 and X2 are located on opposite sides of the Y axis on the coordinate plane and Y1 and Y2 are located on the same side of the X axis on the coordinate plane, it is determined in the direction determining step that the reflective body moves in the X axis direction.

Figure 6:
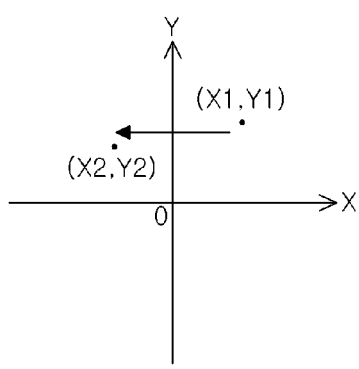
FIGS. 6 to 12 are views showing operations of determining a direction of a reflective body according to conditions of other aspects of the present invention.
Figure 6:
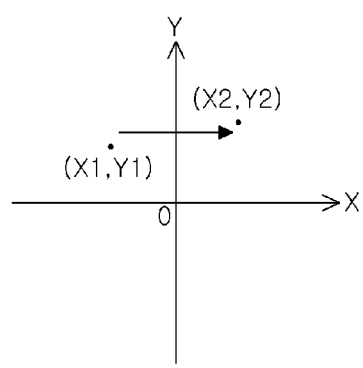
Figure 6:
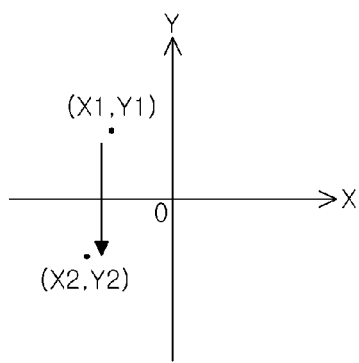
Figure 6:
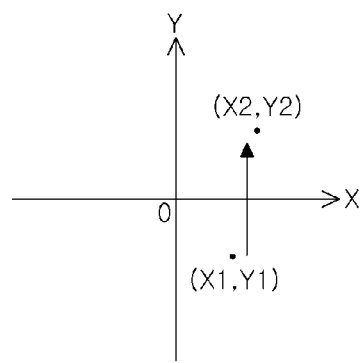

Then, if X1 is a positive number as shown in FIG. 6A, it is determined in the direction determining step that the reflective body moves leftwards, and if X2 is a positive number as shown in FIG. 6B, it is determined in the direction determining step that the reflective body moves rightwards.

That is, assuming that the following condition is satisfied, $$X1 \leq X2 Z O$$

$$Y1 \leq Y2 [ O$$

The data processing unit determines in the direction determining step that the reflective body moves leftwards if X1 is a positive number, and determines in the direction determining step that the reflective body moves rightwards if X2 is a positive number.

2) If X1 and X2 are located on the same with respect to the Y axis on the coordinate plane and Y1 and Y2 are located on opposite sides of the X axis on the coordinate plane, it is determined in the direction determining step that the reflective body moves in the Y axis direction.

Then, if Y1 is a positive number as shown in FIG. 6C, it is determined in the direction determining step that the reflective body moves downwards, and if Y2 is a positive number as shown in FIG. 6D, it is determined in the direction determining step that the reflective body moves upwards.

That is, assuming that the following condition is satisfied, $$Y1 \leq Y2 Z O$$

$$X1 \leq X2 [ O$$

the data processing unit determines in the direction determining step that the reflective body moves downwards if Y1 is a positive number, and determines in the direction determining step that the reflective body moves upwards if Y2 is a positive number.

3) When X1 and X2 are located on opposite sides of the Y axis on the coordinate plane and Y1 and Y2 are located on opposite sides of the X axis on the coordinate plane, it is determined in the direction determining step that the reflective body moves in the X axis direction if the X axis coordinate components X1 and X2 and the Y axis coordinate components Y1 and Y2 satisfy the following equation.

$$cX1 s X2 c / c Y1 s Y2 c$$

(In the relationship, the absolute values of the values of the coordinate components are compared.)

Figure 7:
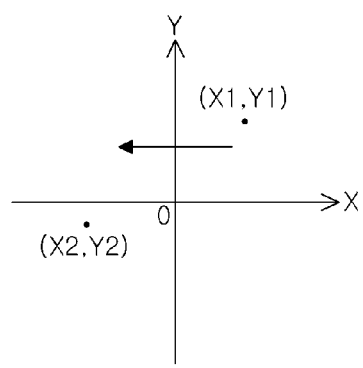
Figure 7:
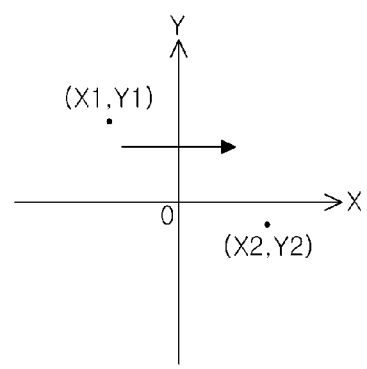
Figure 7:
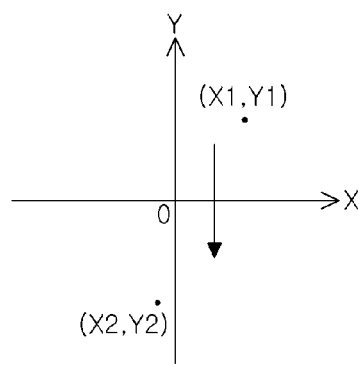
Figure 7:
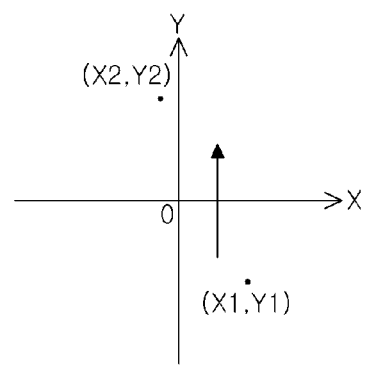

Then, if X1 is a positive number as shown in FIG. 7A, it is determined in the direction determining step that the reflective body moves to the left side, and if X2 is a positive number as shown in FIG. 7B, it is determined in the direction determining step that the reflective body moves to the right side.

Further, when X1 and X2 are located on opposite sides of the Y axis on the coordinate plane and Y1 and Y2 are located on opposite sides of the X axis on the coordinate plane, it is determined in the direction determining step that the reflective body moves in the Y axis direction if the X axis coordinate components X1 and X2 and the Y axis coordinate components Y1 and Y2 satisfy the following equation.

$$cX1 s X2 c Z c Y1 s Y2 c$$

(In the relationship, the absolute values of the values of the coordinate components are compared.)

Then, if Y1 is a positive number as shown in FIG. 7C, it is determined in the direction determining step that the reflective body moves downwards, and if Y2 is a positive number as shown in FIG. 7D, it is determined in the direction determining step that the reflective body moves rightwards.

4) If the planar coordinate (X1, Y1) is located on the Y axis except for the origin in the first position and Y2 is larger or smaller than Y1, it is determined in the direction determining step that the reflective body moves in the Y axis direction.

That is, X1 is zero in the first position.

Figure 8:
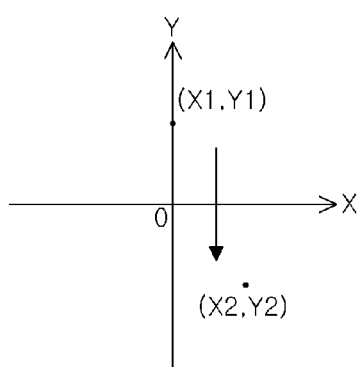
Figure 8:
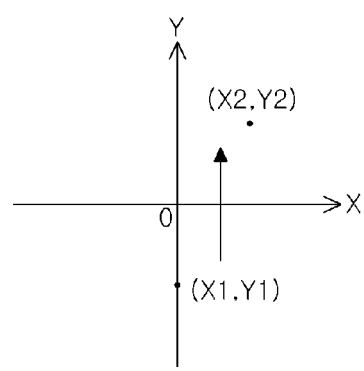
Figure 8:
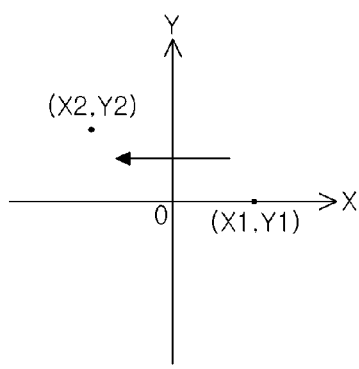
Figure 8:
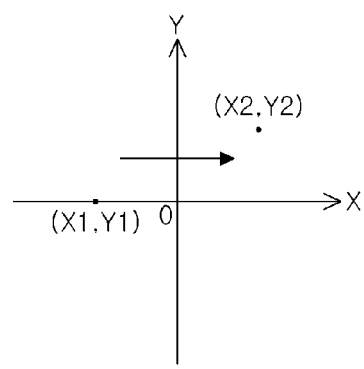

Then, if Y2 is smaller than Y1 as shown in FIG. 8A, it is determined in the direction determining step that the reflective body moves downwards, and if Y2 is larger than Y1 as shown in FIG. 8B, it is determined in the direction determining step that the reflective body moves upwards.

4) If the planar coordinate (X1, Y1) is located on the X axis except for the origin in the first position and X2 is larger or smaller than X1, it is determined in the direction determining step that the reflective body moves in the X axis direction.

That is, Y1 is zero in the first position.

Then, if X2 is smaller than X1 as shown in FIG. 8C, it is determined in the direction determining step that the reflective body moves leftwards, and if X2 is larger than X1 as shown in FIG. 8D, it is determined in the direction determining step that the reflective body moves rightwards.

5) When X1 and X2 are located on the same side of the Y axis and Y1 and Y2 are located on the same side of the X axis, it is determined in the direction determining step that the reflective body move in any one of the X axis direction and the Y axis direction according to a relative difference between an angle $\theta1$ between the X axis and the planar coordinate (X1, Y1) and an angle $\theta2$ between the X axis and the planar coordinate (X2, Y2).

Figure 9:
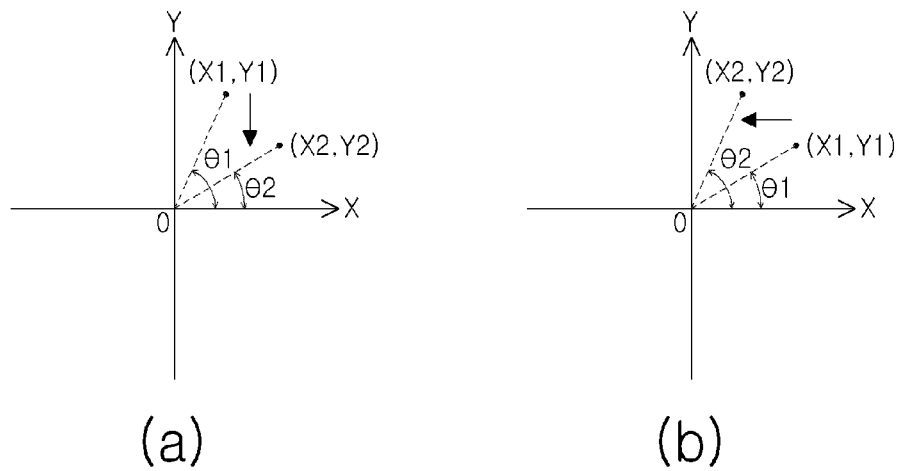

In detail, when (X1, Y1) and (X2, Y2) are located in the first quadrant in the coordinate plane, it is determined in the direction determining step that the reflective body moves downwards if $\theta2$ is smaller than $\theta1$ as shown in FIG. 9A and it is determined in the direction determining step that the reflective body moves leftwards if $\theta2$ is larger than $\theta1$ as shown in FIG. 9B.

Figure 10:
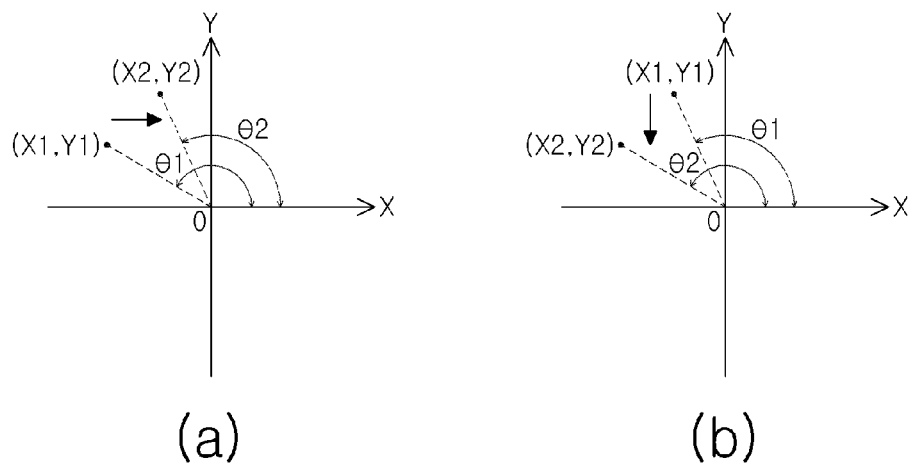

In detail, when (X1, Y1) and (X2, Y2) are located in the second quadrant in the coordinate plane, it is determined in the direction determining step that the reflective body moves rightwards if $\theta2$ is smaller than $\theta1$ as shown in FIG. 10A and it is determined in the direction determining step that the reflective body moves downwards if $\theta2$ is larger than $\theta1$ as shown in FIG. 10B.

Figure 11:
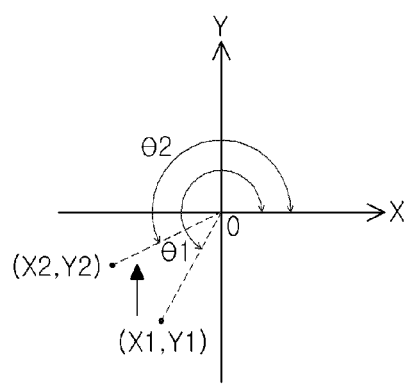
Figure 11:
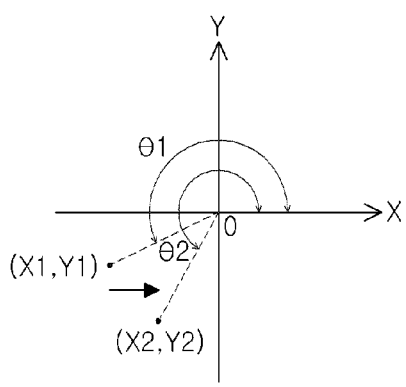

In detail, when (X1, Y1) and (X2, Y2) are located in the third quadrant in the coordinate plane, it is determined in the direction determining step that the reflective body moves upwards if $\theta2$ is smaller than $\theta1$ as shown in FIG. 11A and it is determined in the direction determining step that the reflective body moves rightwards if $\theta2$ is larger than $\theta1$ as shown in FIG. 11B.

Figure 12:
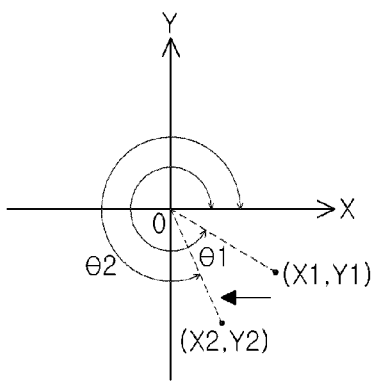
Figure 12:
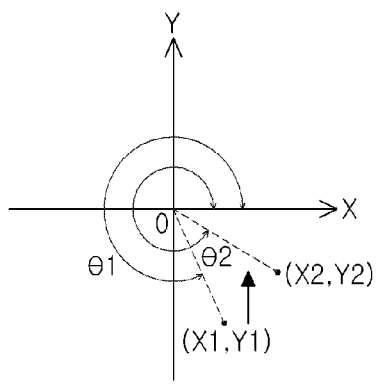

In detail, when (X1, Y1) and (X2, Y2) are located in the fourth quadrant in the coordinate plane, it is determined in the direction determining step that the reflective body moves leftwards if $\theta2$ is smaller than $\theta1$ as shown in FIG. 12A and it is determined in the direction determining step that the reflective body moves upwards if $\theta2$ is larger than $\theta1$ as shown in FIG. 12B.

In the above-described motion recognition method, a complex and unclear motion can be clearly classified and recognized by simplifying a movement direction of the reflective body into any one of the X axis direction and the Y axis direction according to a preset condition to recognize the movement direction of the reflective body, and accordingly, operation errors of the electronic devices based on recognition of a motion can be minimized and the electronic devices can be conveniently used by increasing reliability of the motion switch operated by a motion.

Third Embodiment

Figure 13:
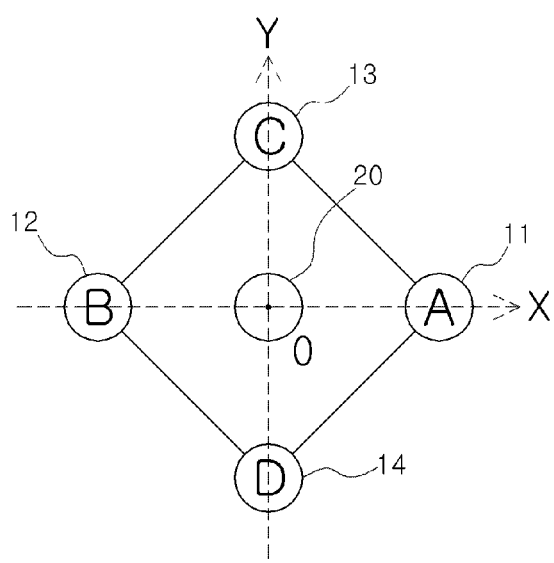
FIG. 13 is a view schematically showing a structure of a motion switch according to a third embodiment of the present invention.

FIG. 13 is a view schematically showing a planar structure of a motion switch according to a third embodiment of the present invention.

The motion switch for realizing the motion recognition method according to the present invention includes a light emitting element 10, a light receiving element 20, and a data processing unit.

The light receiving element 10 includes first and second light emitting elements 11 and 12 disposed to face each other while taking the light receiving element 20 as the center thereof, and third and fourth light emitting elements 13 and 14 disposed to face each other while taking the light receiving element 20 as the center thereof, and the first to fourth light emitting elements 11, 12, 13, and 14 are disposed to be spaced apart from each other by an interval of 90° while taking the light receiving element 20 as the center thereof to sequentially project light at a predetermined interval.

Accordingly, if a reflective body such as a hand of the user passes over the motion switch, the light projected from the light emitting element 10 is reflected by the reflective body and the light receiving element 20 detects the reflected light.

Then, the luminous intensity of the light detected by the light receiving element 20 changes according to the position of the reflective body and the luminous intensity of the light is converted into analog data.

The data processing unit compares the analog data of the light projected by the first light emitting element 11 and the second light emitting element 12 and detected by the light receiving element 20, and calculates X axis coordinate component values of the planar coordinates in the positions of the reflective body.

$$X=A-B$$

(A: Luminous intensity of light projected by the first light emitting element, B: Luminous intensity of light projected by the second light emitting element)

If the reflective body is located over the light receiving element 20 corresponding to the origin of the planar coordinate, the values of A and B are the same such that X=0, if the reflective body moves toward the first light emitting element 11, A increases and B decreases such that X>0, and if the reflective body moves toward the second light emitting element 12, A decreases and B increases such that X<0.

The data processing unit compares the analog data of the light projected by the third light emitting element 13 and the fourth light emitting element 14 and detected by the light receiving element 20, and calculates Y axis coordinate component values of the planar coordinates in the positions of the reflective body.

$$Y=C-D$$

(C: Luminous intensity of light projected by the third light emitting element, B: Luminous intensity of light projected by the fourth light emitting element)

If the reflective body is located over the light receiving element 20 corresponding to the origin of the planar coordinate, the values of C and D are the same such that Y=0, if the reflective body moves toward the third light emitting element 13, A increases and C decreases such that X>0, and if the reflective body moves toward the fourth light emitting element 14, C decreases and D increases such that X<0.

The data processing unit continuously calculates a plurality of planar coordinates on a movement path of the reflective body recognized by the data processing unit, sequentially sets the positions at which points of inflections where an X axis coordinate component and a Y axis coordinate component of the planar coordinate increase or decrease on the path appear as the first position and the second position, and determines a movement direction of the reflective body by comparing a planar coordinate (X1, Y1) of the first position and a planar coordinate (X2, Y2) of the second position.

The motion switch is operated only when the luminous intensity of the light detected by the light receiving element 20 is a predetermined reference or more.

Because the light receiving element 20 detects the light introduced through an upper opened space of the motion switch, external light other than the light projected by the light emitting element 10 and reflected by the reflective body can be detected.

Accordingly, an error in determining a movement direction of the reflective body can be prevented by deferring the movement direction of the reflective body when the luminous intensity of the light detected by the light receiving element 20 is smaller than the predetermined reference value, and determining the movement direction of the reflective body only when the luminous intensity of the light detected by the light receiving element 20 is a predetermined reference value or more.

Furthermore, in order to flexibly respond to an external condition, the reference value may be changed with reference to the luminous intensity of the light reflected by the reflective body and detected by the light receiving element 20.

In addition, when the reflective body enters the light reception range of the light receiving element 20 and is not withdrawn from the light reception range for a predetermined time period, determination of a direction of the reflective body in the direction determining step is deferred.

Moreover, when the reflective body enters the light reception range, the user is informed of detection of the reflective body through light, vibrations, sounds, or the like.

Meanwhile, the motion switch may further include an interpolation element.

The interpolation element is disposed adjacent to the light emitting element 10, and may interpolate the analog data of the light projected by the light emitting element 10 and detected by the light receiving element 20 to increase reliability of data.

When the axial direction of the planar coordinate of the motion switch and a direction of a system (an electronic device or the like) recognized by the motion switch are not symmetrical to each other, the coordinate value set by the motion switch can be adjusted through structural rotational conversions and translational conversions to be applied.

Fourth Embodiment

The fourth embodiment is different from the third embodiment in an aspect of disposition structures of the light emitting device and the light receiving structure.

Figure 14:
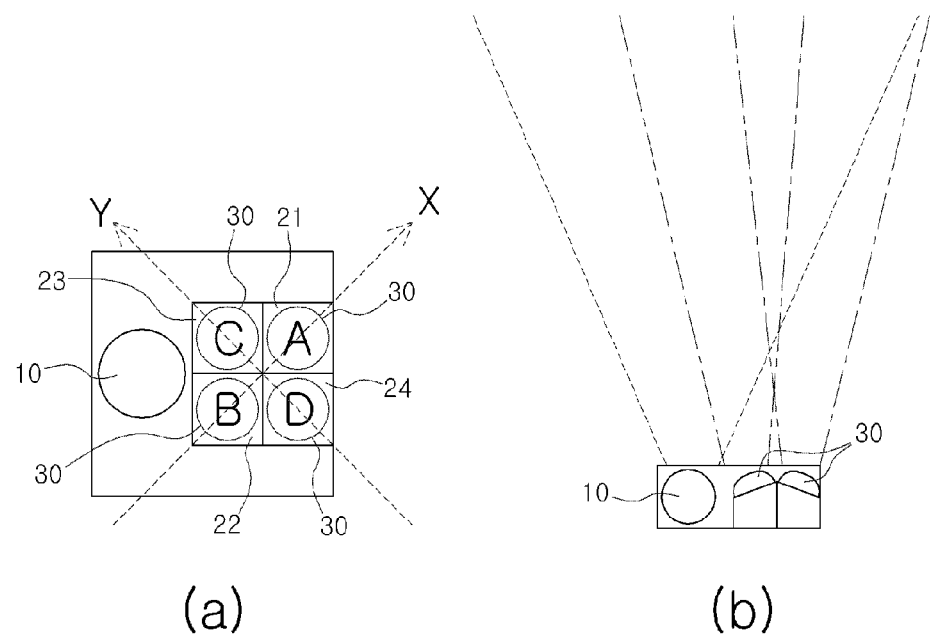
FIG. 14 is a view schematically showing a structure of a motion switch according to a fourth embodiment of the present invention.

FIG. 14 is a view schematically showing a structure of a motion switch according to a fourth embodiment of the present invention.

FIG. 14A is a view schematically showing a planar structure of a motion switch according to a fourth embodiment of the present invention. FIG. 14B is a view schematically showing a side structure of the motion switch according to the fourth embodiment of the present invention.

The motion switch for realizing the motion recognition method according to the fourth embodiment of the present invention includes a light emitting element 0, a light receiving element 20, and a data processing unit (not shown).

The light emitting element 10 projects light at a predetermined interval.

The light receiving elements 20 are disposed to be spaced apart from each other at an interval of 90° while taking the origin acting as the center of the entire light reception range as the center thereof, and the light emitting element 10 is disposed adjacent to the light receiving elements 20.

The light receiving elements 20 include first and second light receiving elements 21 and 22 disposed to face each other with respect to the origin, and third and fourth light receiving elements 23 and 24 disposed to face each other with respect to the origin.

The data processing unit compares the analog data of the light detected by the first light receiving element 21 and the second light receiving element 22, and calculates X axis coordinate component values of the planar coordinates in the positions of the reflective body.

$$X=A-B$$

(A: Luminous intensity of light detected by the first light receiving element, B: Luminous intensity of light detected by the second light receiving element)

The data processing unit compares the analog data of the light detected by the third light receiving element 23 and the fourth light receiving element 24, and calculates Y axis coordinate component values of the planar coordinates in the positions of the reflective body.

$$Y=C-D$$

(C: Luminous intensity of light detected by the third light receiving element, B: Luminous intensity of light detected by the fourth light receiving element)

The light receiving elements 20 include light receiving lenses 30, respectively, and the optical axes of the light receiving lenses 30 are inclined with respect to a vertically upward direction.

Accordingly, the light projected by the light emitting element 10 may be reflected by the reflective body and may be detected by the light receiving elements 20.

The optical axes of the light receiving lenses 30 are inclined with respect to the vertically upward direction such that the light receiving elements 20 may detect light of the same luminous intensity when the reflective body is located at the center of the light reception range.

The other items of the fourth embodiment are the same as those of the third embodiment, and a detailed description thereof will be omitted.

The motion recognition method switch according to the present invention is not limited to the above-described embodiment, but may be variously deformed without departing from the spirit of the present invention.

The invention claimed is:

1. A motion recognition method in which a light emitting element projects light and a light receiving element detects the light reflected by a reflective body to recognize a motion of the reflective body, the motion recognition method comprising:

a light detecting step of detecting light reflected by the reflective body to measure a luminous intensity of the light by the light receiving element;

a first coordinate setting step of setting a planar coordinate (X1, Y1) of the reflective body in which the center of a light reception range of the light receiving element is taken as the origin thereof in a first position using the luminous intensity of the light by a data processing unit;

a second coordinate setting step of setting a planar coordinate (X2, Y2) of the reflective body in which the center of a light reception range of the light receiving element is taken as the origin thereof in a second position using the luminous intensity of the light by a data processing unit; and a direction determining step of, when the reflective body moves from the first position to the second position, obtaining an angle (θ) between a line segment connecting the origin and the planar coordinate (X1, Y1) in the first position and a line segment connecting the planar coordinate (X1, Y1) in the first position and the planar coordinate (X2, Y2) in the second position and determining that the reflective body moves in a direction passing through a ½ point of the angle (θ) in the first position by the data processing unit.

2. The motion recognition method of claim 1, wherein the data processing unit continuously calculates a plurality of planar coordinates (X, Y) on a path which starts from the origin (0, 0) and arrives at the origin (0, 0) again via the first position and the second position according to a light projection interval of the light emitting element, calculates standard values (N) of the planar coordinates (X, Y) with reference to the origin (0, 0), and sets positions of a start point and an end point of a section (2) in which the standard value (N) decreases and then increases as the first position and the second position, and the standard value (N) is calculated in the following equation:

$$N = \sqrt{X^2 + Y^2}.$$

3. The motion recognition method of claim 1, wherein in the direction determining step, a direction in which the reflective body moves is calibrated by adding a weight to the angle (θ).

4. The motion recognition method of claim 1, wherein the light emitting elements are disposed to be spaced apart from each other with respect to each other at an interval of 90°, the center of the light receiving element is the origin of the planar coordinate, the light emitting element comprises:

first and second light emitting elements disposed to face each other with respect to the light receiving element; and third and fourth light emitting elements disposed to face each other with respect to the light receiving element, X1 and X2 which are X axis coordinate components of the planar coordinate of the reflective body are calculated by comparing the luminous intensities of the light projected by the first light emitting element and the second light emitting element and reflected by the reflective body, and Y1 and Y2 which are X axis coordinate components of the planar coordinate of the reflective body are calculated by comparing the luminous intensities of the light projected by the third light emitting element and the fourth light emitting element and reflected by the reflective body.

5. The motion recognition method of claim 4, wherein an interpolation element for interpolating the intensities of the light projected by the light emitting elements and detected by the light receiving element is further disposed adjacent to the light emitting element.

6. The motion recognition method of claim 1, wherein in the direction determining step, a movement direction of the reflective body is determined only when the luminous intensity of the light detected by the light receiving element is a predetermined value or more.

7. The motion recognition method of claim 1, wherein in the detection determining step, when the luminous intensity of the light detected by the light receiving element repeatedly increases and decreases, it is determined that the reflective body moves in a predetermined pattern.

8. The motion recognition method of claim 1, wherein in the direction determining step, when a change rate of the intensity of the light detected by the light receiving element changes according to a predetermined pattern, it is determined that the reflective body rotates.

9. A motion recognition method in which a light emitting element projects light and a light receiving element detects the light reflected by a reflective body to recognize a motion of the reflective body, the motion recognition method comprising:
a light detecting step of detecting light reflected by the reflective body to measure a luminous intensity of the light by the light receiving element;
a first coordinate setting step of setting a planar coordinate $(X1, Y1)$ of the reflective body in which the center of a light reception range of the light receiving element is taken as the origin thereof in a first position using the luminous intensity of the light by a data processing unit;
a second coordinate setting step of setting a planar coordinate $(X2, Y2)$ of the reflective body in which the center of a light reception range of the light receiving element is taken as the origin thereof in a second position using the luminous intensity of the light by a data processing unit; and
a direction determining step of, when the reflective body moves from the first position to the second position, determining that the reflective body moves in any one of the X axis direction and the Y axis direction according to a relative position of X1 and X2 which are X axis coordinate components and a relative position of Y1 and Y2 which are Y axis coordinate components by the data processing unit.

10. The motion recognition method of claim 9, wherein the data processing unit continuously calculates a plurality of planar coordinates $(X, Y)$ on a path which starts from the origin $(0, 0)$ and arrives at the origin $(0, 0)$ again via the first position and the second position according to a light projection interval of the light emitting element, and sequentially sets the positions at which points of inflections where an X axis coordinate component and a Y axis coordinate component of the planar coordinate increases or decreases on the path appear as the first position and the second position.

11. The motion recognition method of claim 9, wherein if X1 and X2 are located on opposite sides of the Y axis on the coordinate plane and Y1 and Y2 are located on the same side of the X axis on the coordinate plane, it is determined in the direction determining step that the reflective body moves in the X axis direction.

12. The motion recognition method of claim 9, wherein if X1 and X2 are located on the same side of the Y axis on the coordinate plane and Y1 and Y2 are located on opposite sides of the X axis on the coordinate plane, it is determined in the direction determining step that the reflective body moves in the Y axis direction.

13. The motion recognition method of claim 9, wherein when X1 and X2 are located on opposite sides of the Y axis on the coordinate plane and Y1 and Y2 are located on opposite sides of the X axis on the coordinate plane, it is determined in the direction determining step that the reflective body moved in the X axis direction if the X axis coordinate components X1 and X2 and the Y axis coordinate components Y1 and Y2 satisfy the following equation:

$$cX1sX2c\!\!\not|cY1sY2c.$$

14. The motion recognition method of claim 9, wherein when X1 and X2 are located on opposite sides of the Y axis on the coordinate plane and Y1 and Y2 are located on opposite sides of the X axis on the coordinate plane, it is determined in the direction determining step that the reflective body moved in the Y axis direction if the X axis coordinate components X1 and X2 and the Y axis coordinate components Y1 and Y2 satisfy the following equation:

$$cX1sX2cZcY1sY2c.$$

15. The motion recognition method of claim 9, wherein if the planar coordinate $(X1, Y1)$ is located on the Y axis except for the origin in the first position and Y2 is larger or smaller than Y1, it is determined in the direction determining step that the reflective body moves in the Y axis direction, and if the planar coordinate $(X1, Y1)$ is located on the X axis except for the origin in the first position and X2 is larger or smaller than X1, it is determined in the direction determining step that the reflective body moves in the X axis direction.

16. The motion recognition method of claim 9, wherein when X1 and X2 are located on the same side with respect to the Y axis and Y1 and Y2 are located on the same side with respect to the X axis, it is determined in the direction determining step that the reflective body move in any one of the X axis direction and the Y axis direction according to a relative difference between an angle between the X axis and the planar coordinate $(X1, Y1)$ and an angle between the X axis and the planar coordinate $(X2, Y2)$.

17. The motion recognition method of claim 9, wherein the light emitting elements are disposed to be spaced apart from each other with respect to each other at an interval of 90°,
the center of the light receiving element is the origin of the planar coordinate,
the light emitting element comprises:
first and second light emitting elements disposed to face each other with respect to the light receiving element; and
third and fourth light emitting elements disposed to face each other with respect to the light receiving element; and
X1 and X2 which are X axis coordinate components of the planar coordinate of the reflective body are calculated by comparing the luminous intensities of the light projected by the first light emitting element and the second light emitting element and reflected by the reflective body, and
Y1 and Y2 which are Y axis coordinate components of the planar coordinate of the reflective body are calculated by comparing the luminous intensities of the light projected by the third light emitting element and the fourth light emitting element and reflected by the reflective body.

* * * * *